Aug. 18, 1953     P. WARGO     2,649,559
ELECTRIC TACHOMETER

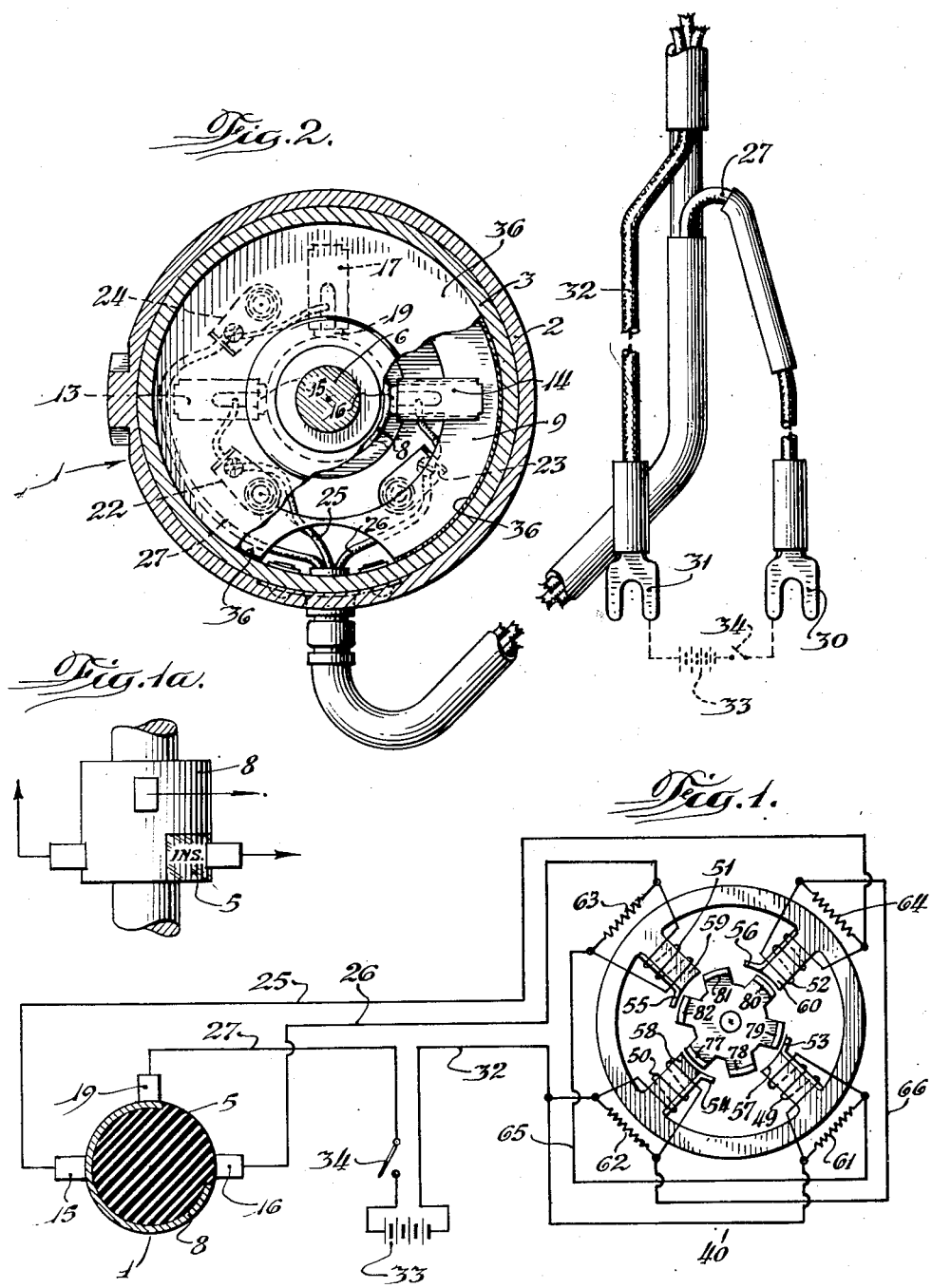

Filed Dec. 1, 1949     6 Sheets-Sheet 2

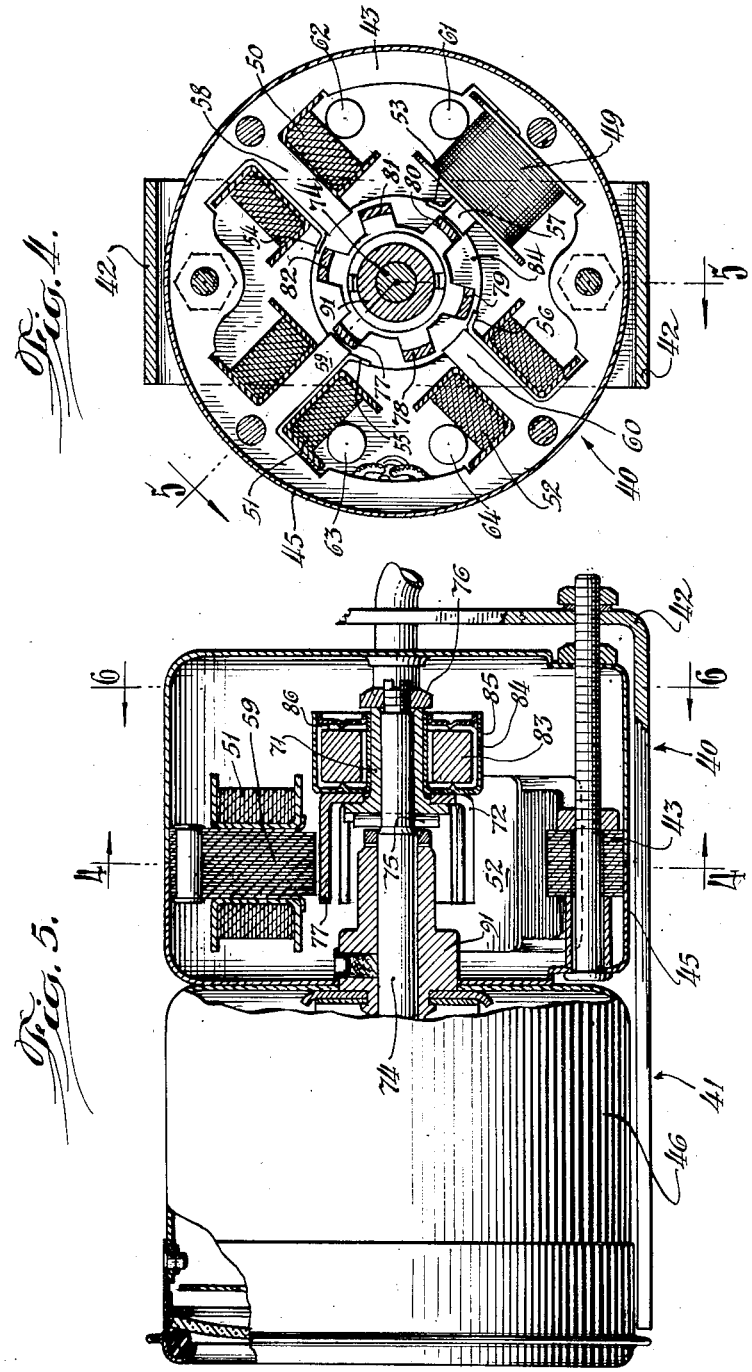

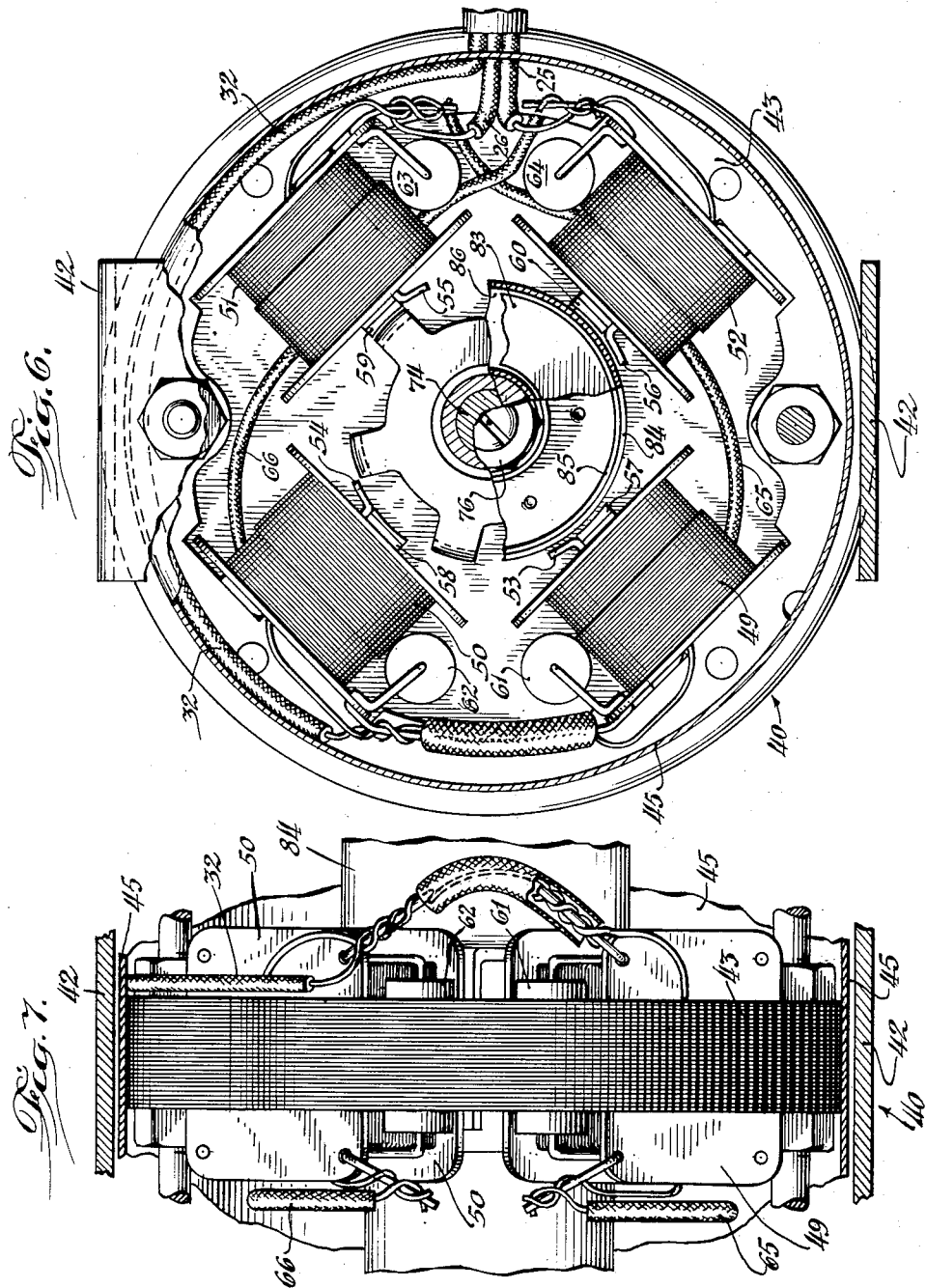

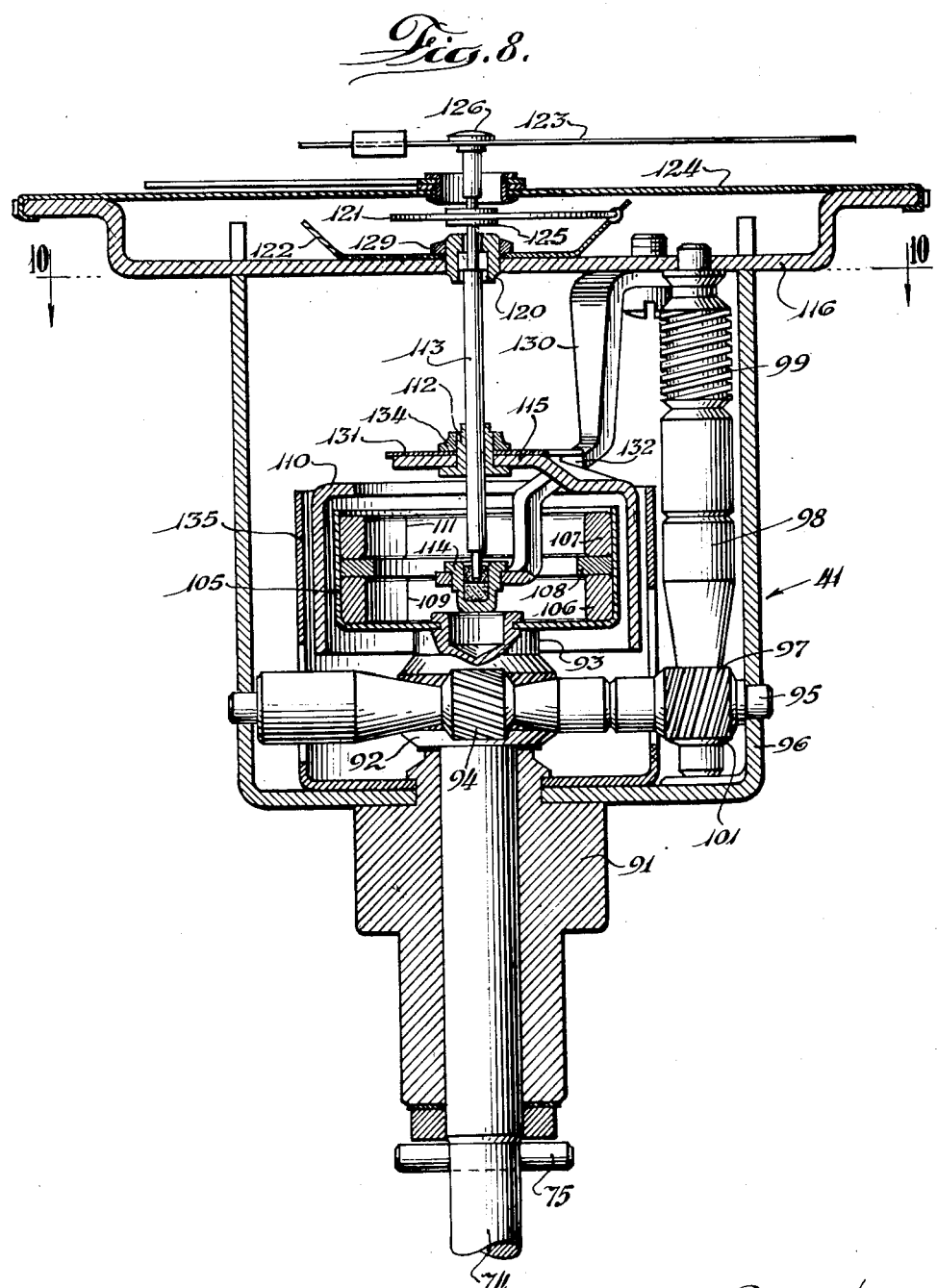

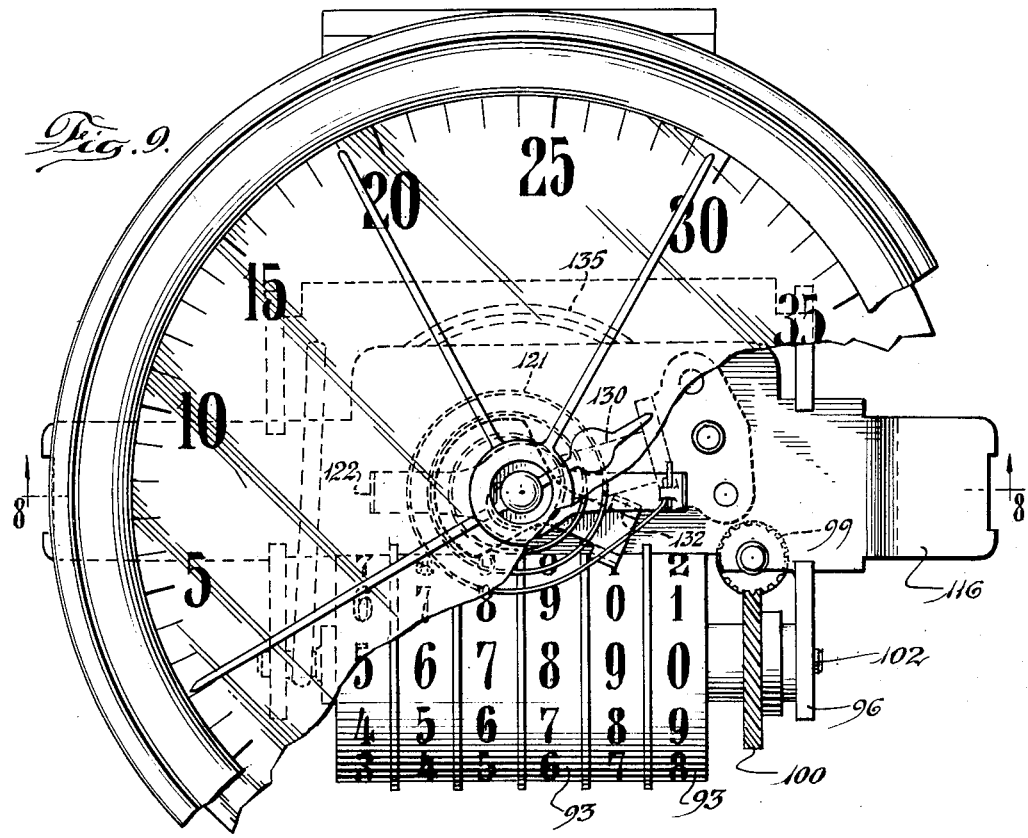
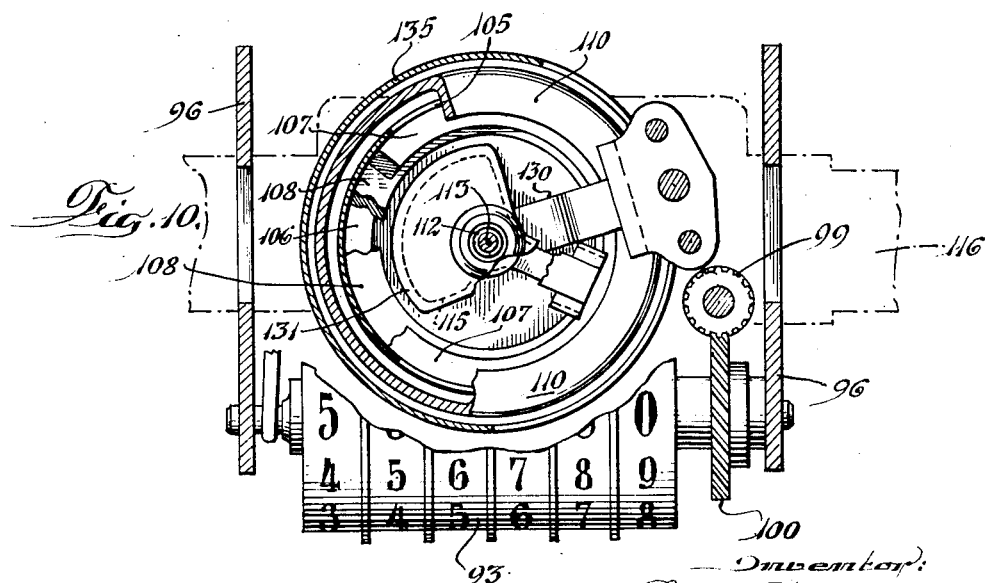

Patented Aug. 18, 1953

2,649,559

UNITED STATES PATENT OFFICE 2,649,559

ELECTRIC TACHOMETER

Peter Wargo, Maywood, Ill., assignor to Stewart-Warner Corporation, Chicago, Ill., a corporation of Virginia Application December 1, 1949, Serial No. 130,566

15 Claims. (Cl. 318—27)

1

My invention relates to an electric tachometer of the type in which the moving part whose speed is to be measured is mechanically coupled to a sending unit which is electrically coupled to a receiving unit located remotely from the moving part.

While my invention may be adapted to indicate the speed and to count the number of complete excursions of any part having a cyclical motion, it is particularly well suited for indicating the speed and counting the revolutions of an internal combustion engine.

Thus the general object of my invention is to provide an improved type of electric tachometer. This specification will disclose many other and more specific objects, which include the following:

1. To provide a tachometer receiving unit which will operate on direct current pulses produced by a sending unit;

2. To provide a tachometer which will give accurate speed and odometer indications for a wide range of speeds and conditions of acceleration and deceleration;

3. To provide a tachometer which will give accurate speed and odometer indications despite wide variations of the voltage of the direct current source, which supplies the tachometer;

4. To provide an electric tachometer pulse motor which will run at a proper pulse-controlled speed independently of temperature variations;

5. To provide an electric tachometer pulse motor in which all indexing is magnetic and hence quiet;

6. To provide an electric tachometer pulse motor which will rotate steadily without vibration or rocking effects;

7. To provide an electric tachometer pulse motor which will rotate in one direction only, regardless of the direction of movement of the part driving the sending unit;

8. To provide an electric tachometer pulse motor which can be readily adjusted for rotation either in a clockwise or a counterclockwise direction;

9. To provide a speed indicating device of the magnetic drag type which is accurate and dependable throughout a wide speed range;

10. To provide a speed indicator of the magnetic drag type which is provided with a strong and well-distributed magnetic field; and 11. To provide a speed indicator which will be accurate despite wide temperature variations.

Other objects and advantages of the present invention will become apparent from the following description of an illustrative embodiment of the invention, in the course of which reference is had to the accompanying drawings, in which:

Fig. 1 is a diagrammatic view of the tachometer sending unit and pulse motor, together with the associated electrical connections;

Fig. 1a is a diagrammatic view of the tachometer sending unit and is in a conventional orthographic relationship with the corresponding part of Fig. 1. Thus, if Fig. 1a is taken as an elevational view of the sending unit, Fig. 1 correspondingly shows a bottom sectional view;

Fig. 2 is a sectional view of the sending unit with part of the dust cover broken away, taken on plane 2—2 of Fig. 3;

Fig. 4 is a front sectional view of the tachometer receiving unit taken on plane 4—4 of Fig. 5;

Fig. 5 is an elevational view of the tachometer receiving unit with the rear portion, comprising the tachometer pulse motor, shown in a section taken on the revolved plane 5—5 of Fig. 4;

Fig. 6 is a rear sectional view of the tachometer pulse motor taken on the plane 6—6 of Fig. 5 and with portions of the fluid flywheel and its housing and cover broken away to show the detailed construction;

Fig. 7 is a fragmentary side elevational view of the tachometer pulse motor with the pulse motor housing broken away;

Fig. 8 is a fragmentary bottom sectional view, taken on the plane 8—8 of Fig. 9, of the front portion of the tachometer receiving unit, with the pulse motor and the indicator housing broken away;

Fig. 9 is a front elevational view of the tachometer receiving unit with portions of the bezel, the glass face and the dial broken away to show the detailed construction; and Fig. 10 is a front sectional view of the tachometer receiving unit, taken on plane 10—10 of Fig. 8, with portions of the indicating drums broken away.

Figure 3:
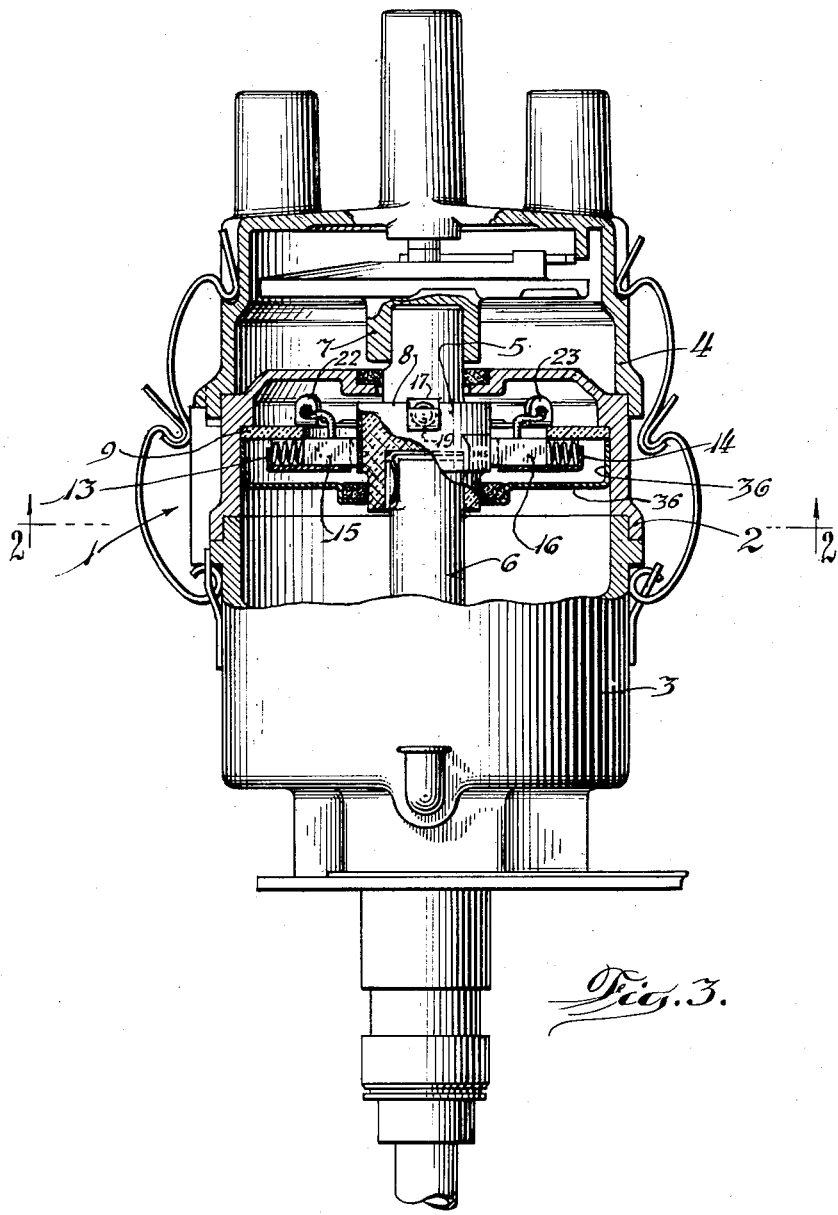
Fig. 3 is an elevational sectional view of the sending unit assembled between the cap and the body of an ignition distributor.

Before proceeding with a detailed description of the illustrative embodiment of my invention I will outline its general construction and operation.

An electric battery or some other source of electric current energizes the tachometer system.

A sending unit, comprising an improved single pole multiple throw type switch mechanically coupled to the crankshaft of the engine, supplies direct current pulses to two circuits which are connected by conductors to a remotely located receiving unit.

At the receiving unit the direct current pulses operate a synchronous pulse motor of a novel type which in turn drives an indicator assembly comprising an odometer and an improved magnetic drag type speed indicator.

The sending unit 1, shown in Figs. 1, 2 and 3, has an inverted cup-shaped stator 2 adapted to be secured between the body 3 and the cap 4 of an ignition distributor as shown in Fig. 3. A rotor 5, made of nonconducting material, has a detachable driving connection at its lower end with the distributor driving shaft 6, and a similar connection at its upper end with the distributor rotor 7.

A ring-shaped commutator 8 is press-fitted over the rotor 5. The upper portion of the commutator 8 is completely cylindrical, but a part of the lower portion is cut away leaving a gap illustrated as extending over approximately one-fourth of the circumference of the commutator 8.

Two brush holders 13 and 14, holding two diametrically opposite, radially spring-pressed brushes 15 and 16, are mounted on the lower side of an insulating plate 9 secured to the stator 2. A brush holder 17, holding a radially spring-pressed brush 19, is mounted on the upper side of the plate 9.

The lower brushes 15 and 16 are connected by conductors 25 and 26 to the tachometer receiving unit. The upper brush 19 is connected by a conductor 27 to one terminal lug 30 of a pair normally connected to the electric battery 33 through the ignition switch 34. The other terminal lug 31 of the pair is connected to a conductor 32 extending to the receiving unit.

The bottom of the sending unit is closed by a dust cover 36.

The conductors 25, 26, 27 and 32 may be cabled as shown.

Any equivalent switching mechanism may be employed in the sending unit instead of the switch described and illustrated. Further, the switch may be connected with the engine in any suitable manner since the manner shown of coupling with the distributor is not essential although preferred for its simplicity and convenience.

The tachometer receiving unit, shown in Figs. 1 and 4 to 10, comprises a pulse motor 40 driving an indicator 41. A U-shaped mounting bracket 42 is provided for securing the receiving unit in a desired location.

The pulse motor 40, shown in Figs. 1 and 4 to 7, occupies a housing 45 which is secured to the rear of the indicator assembly housing 46. A field core 43 made of laminated steel is bolted within the housing 45. The core 43 is generally ring-shaped and has four inwardly directed equally spaced poles 57 to 60 around which four coils 49 to 52 are wound. The poles 57 to 60 are provided with individual extending members 53 to 56, respectively, which extend the faces of the poles 57 to 60 in one direction.

As best shown in Fig. 1, the coils 49 to 52 are shunted with antispark resistors 61 to 64, respectively. Two of the coils, 49 and 51, which are diametrically opposite, are connected in series by a conductor 65, while the remaining two diametrically opposite coils, 50 and 52, are connected in series by a conductor 66.

One end of the series circuit of coils 49 and 51 is connected to the sending unit 1 by the conductor 26, and the other end is connected to the battery 33 through the conductor 32 and terminal lug 31.

Similarly, one end of the series circuit of the other two coils, 50 and 52, is connected to the sending unit 1 by the conductor 25, and the other end to the battery 33 through the conductor 32 and terminal lug 31.

The rotatable parts of the pulse motor 40 are mounted on a bushing 71 (Figs. 4, 5 and 6) secured by a nut 76 over a shaft 74 (Figs. 5 and 8) extending from the rear of the indicator 41. The slotted flange-like front portion of the bushing 71 engages a pin 75 fixed transversely through the shaft 74.

A generally cylindrical armature 72, of magnetically permeable sheet material, slotted to form six blade-like poles 77 to 82, is secured around the front of the bushing 71 for rotation within the field poles 57 to 60.

The armature 72 is provided with a ring-shaped fluid-coupled flywheel 83 having a housing 84, closed by a cover 85, press-fitted around the rear of the bushing 71. A viscous oil 86 fills the space between the flywheel 83 and the housing 84.

The indicator 41 occupies a housing 46 at the front of the receiving unit. The shaft 74 (Figs. 5 and 8) extends through a sleeve bearing 91 in the rear of the housing 46 and serves to support the rotary parts of the pulse motor 40 and to drive the indicator 41.

The indicator 41 comprises odometer and speedometer mechanisms. The odometer mechanism is of a conventional type consisting of a plurality of indicating drums 93 driven by a worm gear train from the shaft 74. This worm gear train comprises a worm 92 at the front end of the shaft 74 driving in succession a worm wheel 94 on a transverse horizontal shaft 95 supported by a frame 96 mounted within the housing 46, a worm 97 on the transverse shaft 96, a worm wheel 101 on the rear end of a longitudinal horizontal shaft 98, a worm 99 at the front end of the longitudinal shaft 98 and a worm wheel 100 mounted on a shaft 102 supporting the drums 93.

The speed indicator mechanism is of the eddy current drag type. Eddy currents are induced in an aluminum cup 110 when two ring-shaped magnets 106 and 107 are rotated by the shaft 74. The interaction of the magnetic fields caused by the eddy currents and the magnets 106 and 107 produces a torque upon the aluminum cup 110. This causes the rotation of the aluminum cup 110 and the development of a countertorque from a hair spring 121 which restrains the rotation of the cup 110.

The magnets 106 and 107, which are circular rings formed from bars of a ductile material of high magnetic coercive force such as cunife, are press-fitted into a nonmagnetic supporting cup 105 secured to the front end of the shaft 74. A compensating ring 108 is assembled between the magnets 106 and 107 in the cup 105. Each of the ring magnets 106, 107 has four magnetic poles equally spaced around the ring. The supporting cup 105 holds the magnets 106, 107 so that the poles on the two magnets are adjacent one another. The magnetic poles are located so that poles are produced at the butt joints 109 and 111 in the magnets 106 and 107. Thus the joints 109 and 111 are placed where they will least affect the magnetic fields of the magnets 106 and 107.

The aluminum cup 110 is assembled so as to surround the cup 105 which supports the magnets 106 and 107, and is mounted by a single spoke 115 to a bushing 112 press-fitted on a shaft 113. The shaft 113 rests in a rear jeweled bearing 114 and passes through a front jeweled bearing 120 supported by a front bracket 116 attached to the frame 96. A pointer 123 is secured by means of a bushing 126 to the extreme front end of the shaft 113, and a dial 124 is attached to the front bracket 116 just behind the pointer 123. Between the dial 124 and the front bracket 116 a bushing 125 supporting the inside end of a spiral hairspring 121 is press-fitted to the shaft 113. An adjusting lever 122 which supports the outside end of the hairspring 121 is provided for regulating the tension of the hairspring 121 and thereby calibrating the speedometer mechanism. This adjusting lever 122 is fitted around the outside of the front jeweled bearing 120 and held against the front bracket 116 by a nut 129.

The rear jeweled bearing 114 is supported by a brass arm 130 which is screwed to the front bracket 116. A phosphor bronze stop 131, provided with two lugs 132 and 133 which straddle the spoke 115, is fitted over the bushing 111 which supports aluminum cup 110 and is secured thereto by a retainer ring 134. When the indicator assembly is at rest the lug 132 of the stop 131 rests upon the arm 130. The stop 131 is shaped so as to counterbalance the spoke 115 and thus balance the aluminum cup 110.

A steel cup 135 secured to the rear of the frame 96 surrounds the aluminum cup 110 and provides a return path for the flux from the magnets 106 and 107.

The compensating ring 108 is made of a material having a relatively low permeability which decreases rapidly when the temperature increases, and vice versa. Being located between the ring magnets 106 and 107, the compensating ring 108 acts as a shunt path for the flux from the magnets 106 and 107. However, the shunting effect decreases if the temperature increases and hence tends to compensate for other changes which otherwise cause loss of flux from the magnets 106, 107 if the temperature increases.

The use of the spaced-apart ring magnets 106, 107 produces a greater drag torque than would the use of a single larger ring magnet of the same total weight, because spacing apart the two magnets 106 and 107 spreads out the magnetic field and thus brings about a utilization of a greater portion of the magnetic flux to produce torque upon the aluminum drag cup 110. The use of four magnetic poles upon each of the magnets 106 and 107 provides considerably greater torque than would the use of the conventional two poles because the magnetic material is used more efficiently in the four pole construction.

The operation of the indicator 41 has already been described, and now the operation of the sending unit 1 and the pulse motor 40 will be described with particular reference to Figs. 1 and 1a. It will be seen that the pulse motor 40 operates because the number of pairs of armature poles is different from the number of pairs of field poles, and because the difference is such that two adjacent field poles cannot be aligned simultaneously with two armature poles. The construction shown with three pairs of armature poles and two pairs of field poles satisfies these requirements.

When the switch 34 is closed, current from the battery 33 flows through the switch 34 to the upper brush 19, continuously contacting the commutator 8, and thence through the lower brush 15, the conductor 25, the series circuit of coils 52 and 50, and the conductor 32 back to the battery. Thus the pair of field poles 58 and 60 is magnetized, and a pair of armature poles such as 77 and 80 will be attracted into alignment with the field poles 58 and 60 as shown in Fig. 1. The other armature poles 78, 79, 81 and 82 are not aligned with the other field poles 57 and 59.

If the commutator 8 is rotated slightly counterclockwise, the opposite coils 49 and 51 will be energized through the brush 16 and the corresponding field poles 57 and 59 will be magnetized. The forces of attraction between the extensions 53 and 55 on the field poles 57 and 59, and the adjacent armature poles 79 and 82 will rotate the armature 72 slightly clockwise, but such rotation will be restrained by the attractive forces between the poles 58 and 60 and the aligned armature poles 77 and 80.

If the commutator 8 is then rotated counter-clockwise 90 degrees farther, the coils 58 and 60 will be disconnected from the battery 33, and the armature 72 will rotate clockwise so that the armature poles 79 and 82 come into alignment with the field poles 57 and 59.

A further 90 degree rotation of the commutator 8 will again connect the coils 50 and 52 to the battery 33. The forces of attraction between the pole extensions 54 and 56 and the armature poles 78 and 81 will rotate the armature 72 slightly clockwise, but this rotation will be restrained by the attractive forces between the field poles 57 and 59 and the aligned armature poles 79 and 82.

A further 90 degree rotation of the commutator 8 will disconnect the coils 49 and 51 from the battery 33 and the armature 72 will be free to rotate clockwise so that armature poles 78 and 81 come into alignment with field poles 58 and 60 and this alignment will continue as the commutator 8 is rotated still further so as to complete one revolution. The armature 72 will have advanced in a clockwise direction the angular distance between adjacent armature poles, which is 60 degrees for the construction shown in the drawings. Thus the speed of rotation of the armature 72 will be directly proportional to the speed of rotation of the commutator 8.

It will be apparent that the pulses of direct current supplied by the sending unit 1 to the two series coil circuits overlap in time so that at least one pair of poles 57 to 60 is always magnetized. Thus, the armature 72 is always magnetically locked in step. The magnetic indexing thus provided is entirely quiet in operation and is, therefore, superior to mechanical indexing.

The direction of rotation of the pulse motor 40 can be reversed merely by inverting the field core 43 together with the coils 49 to 52 and the pole extensions 53 to 56, or by assembling the pole extensions 53 to 56 on the opposite sides of the poles 57 to 60.

The fluid-coupled flywheel 83 of conventional design is provided to smooth out irregularities in the rotation of the armature 72 and to provide sufficient frictional damping to prevent the occurrence of any sustained oscillations of the armature 72. If the armature 72 of the pulse motor 40 rotates at constant speed or with gradual acceleration, the viscous oil 86 will be effective to couple the flywheel 83 to its housing 84 with negligible slipping. However, any great acceleration of the armature 72 will produce slipping between the flywheel 83 and its housing 84 and a consequent frictional damping effect.

It is not essential to this invention that the tachometer pulse motor have two field pole pairs and three armature pole pairs as shown, although this construction is preferred for its simplicity and low cost. Equivalent constructions will result from the provision of different numbers of field or armature poles. Such constructions will be operative according to the principles of this invention if any number of field poles greater than one is used, and if a different number of armature poles, not a whole number multiple of the number of field poles, is used. Even numbers of field and armature poles are preferable in order to prevent vibration and wear on the motor bearings. Thus, for example, four field poles and two, six or ten armature poles, or six field poles and two, four, eight or ten armature poles, may be provided. All of these constructions are operative according to the principles of this invention. In every case it is essential to this invention that the field poles be energized in some regular rotatively progressive sequence by pulses of electric current.

For this purpose the sending unit may be provided with any appropriate number of brushes, and a corresponding number of circuits for connecting the sending unit with the receiving unit may be provided.

It will be noted that, in the pulse motor illustrated and described, diametrically opposite field coils are connected in series and excited simultaneously. This is done to reduce vibration and bearing wear and also to provide for the operation of a four field pole motor from a two-circuit sending unit. Thus, it may be said that the four pole motor shown is a meritorious combination of two motors having two field poles and three armature poles each. It will be clear that the field coils of any motor according to this invention having more than four coils may be connected in two groups for excitation from a two-circuit sending unit. Likewise, in any case in which the number of field coils is greater than the number of sending unit circuits, the field coils may be connected in appropriate groups.

Pole extensions, which may be integral with the field poles, are essential to the embodiment of this invention which has been described in detail, in order to insure rotation of the tachometer pulse motor in the proper direction. Fig. 1 shows clearly that the field pole pitch is such that two armature poles 78 and 79 are equidistant from a field pole 57 when the adjacent field pole 58 is aligned with an armature pole 77. Therefore, were it not for the pole extensions, the armature might equally well rotate in either direction if the field poles are successively magnetized. The provision of the pole extensions renders the motor field structure nonsymmetrical and thus insures unidirectional rotation of the armature.

In some cases pole extensions will not be necessary for other embodiments of this invention using different numbers of field or armature poles. Such extensions are necessary only if the field pole pitch of a given motor is equal to or a whole number multiple of one-half the armature pole pitch. Only if this is the case will the direction of rotation be indeterminate. Since the pole pitch, expressed in fractional revolutions, is equal to the reciprocal of the number of poles, it follows that pole extensions are needed only if the number of armature poles in a given motor is equal to or an integral multiple of one-half the number of field poles. Upon application of this formula it is apparent, for example, that all pulse motors using four field poles will require pole extensions because an even number of armature poles is always used. However, if six field poles are used, pole extensions will not be needed because none of the operative structures, such as those using two, four, eight or ten armature poles, fall within the rule. Motors using eight field poles will require pole extensions if four or twelve armature poles are used, for instance, but not if two, six or ten armature poles are used, for instance.

Since this invention provides a synchronous type of tachometer pulse motor, variations of voltage and temperature over a wide range will not affect the speed of the motor. Furthermore, synchronous operation of the motor is assured over a wide range of speeds and conditions of acceleration and deceleration.

The sending unit switch illustrated has the advantage of simplicity and compactness. Moreover, the frictional drag of the three brushes is so small that there is no possibility of adversely affecting the operation of the automatic spark advance mechanism associated with many ignition distributors.

One important advantage of this invention is its ability to operate satisfactorily with a simple sending unit switch such as that described which is compact enough to fit into the relatively small space available in a sending unit which is fitted between the cap and the base of a distributor.

While the invention has been described in connection with the details of an illustrative embodiment, it should be understood that these details are not intended to be limitative of the invention except in so far as set forth in the accompanying claims.

Having thus described my invention, what I claim as new and useful and desire to secure by Letters Patent of the United States is:

1. In an electric tachometer for measuring the speed of a moving part, the combination of a switch having an operating member adapted to be connected with the part, a source of electric power, four field poles remotely located from the part, an individual field coil for each field pole, a pole extension forming a part and extending one side of each field pole, a plurality of conductors connecting the field coils into two groups, two circuits connecting the groups with the switch and the source, the switch being so constructed that when operated by the part it sequentially connects the groups with the source for intervals of energization in such fashion that successive intervals overlap, and a magnetically permeable armature mounted for rotation adjacent the field poles and having six armature poles, whereby the armature is rotated at a speed proportional to the speed of the moving part.

2. In an electric tachometer for measuring the speed of a rotating part, the combination of a switch having a rotatable operating member adapted to be connected with the part, a source of electric power, four equidistantly spaced field poles remotely located from the part, an individual field coil for each field pole, a pole extension forming a part and extending one side of each field pole, a plurality of conductors connecting the field coils into two groups, two circuits connecting the groups with the switch and the source, the switch member being so constructed that when operated by the part it sequentially connects the groups with the source for intervals of energization in such fashion that successive intervals overlap, and a magnetically permeable armature mounted for rotation adjacent the field poles and having six equidistantly spaced armature poles, the armature poles having a pitch different than that of the field poles so that the armature is rotated toward the field pole extensions and at a speed proportional to the speed of the rotating part.

3. In an electric tachometer for measuring the speed of a moving part, the combination of a switch having an operating member adapted to be connected with the part, a source of electric power, four field poles remotely located from the part, individual field coils for the poles, an individual pole extension forming a part and extending one side of each field pole, a plurality of conductors connecting the field coils into two groups, two circuits connecting the groups with the switch and the source, the switch being constructed so that when operated by the part it sequentially connects the source with first one group, second with both groups in parallel, third with the other group and fourth with both groups in parallel for energization, and a magnetically permeable armature mounted for rotation adjacent the field poles and having six armature poles, whereby the armature is rotated at a speed proportional to that of the moving part.

4. In an electric tachometer for measuring the speed of a rotating part, the combination of a single pole double throw switch having a rotatable member adapted to be connected with the part, a source of electric power, four field poles remotely located from the part, an individual field coil for each field pole, an individual pole extension forming a part of and extending one side of each pole, a plurality of conductors connecting the field coils into two groups, two circuits connecting the groups with the switch and the source, the switch being operated by the part sequentially to connect the groups for energization with the source so that during a portion of the energization time both groups are fully energized and during the remainder of said time one or the other group is energized, and a magnetically permeable armature mounted for rotation adjacent the field poles and having six armature poles, whereby the armature is rotated at a speed proportional to the speed of the moving part.

5. In an electric tachometer for measuring the speed of a moving part, the combination of a switch having an operating member adapted to be connected with the part, a source of electric power, a plurality of equidistantly spaced electromagnetic field poles including a plurality of field coils, an individual pole extension forming a part and extending one side of each field pole, a plurality of conductive circuits connecting the field coils with the switch and the source, the switch being constructed sequentially to connect the field coils with the source for intervals, and a magnetically permeable motor armature mounted for rotation adjacent the field poles and including a plurality of equidistantly spaced armature poles differing in number from and not a multiple of the number of field poles and having a pole pitch different from that of the field poles whereby the armature is rotated at a speed proportional to the speed of the moving part.

6. In an electric tachometer for measuring the speed of a moving part, the combination of a switch having an operating member adapted to be connected with the part, a source of electric power, a plurality of equidistantly spaced electromagnetic field poles including a plurality of field coils, an individual pole extension forming a part and extending one side of each field pole, a plurality of conductive circuits connecting the field coils with the switch and the source, the switch being constructed sequentially to connect the field coils with the source for intervals so that, successive intervals of connection overlap, a magnetically permeable motor armature mounted for rotation adjacent the field poles and including a plurality of equidistantly spaced armature poles differing in number from and not a multiple of the number of field poles and having a pole pitch different from that of the field poles, and a fluid-coupled flywheel rotatably connected with the armature to smooth the rotation of the armature, whereby the armature is rotated at a speed proportional to that of the moving part.

7. In an electric tachometer for measuring the speed of a moving part, the combination of a switch having an operating member adapted to be connected with the part, a source of electric power, a plurality of electromagnetic field poles including a plurality of field coils, a plurality of conductive circuits connecting the field poles with the switch and the source, the switch being constructed sequentially to connect the field coils with the source for intervals so that, successive intervals of connection overlap, and a magnetically permeable motor armature mounted for rotation adjacent the field poles and including a plurality of armature poles differing in number from and not a multiple of the number nor of one-half the number of field poles and having a pole pitch different from that of the field poles, whereby the armature is rotated at a speed proportional to that of the moving part.

8. In an electric tachometer for measuring the speed of a moving part, the combination of a switch having an operating member adapted to be connected with the part, a source of electric power, a plurality of equidistantly spaced electromagnetic field poles including a plurality of field coils, a plurality of conductors connecting the field coils the switch and the source in a plurality of circuits, the switch being constructed sequentially to connect the field coils with the source for magnetization of the field poles in response to movement of the part, and a magnetically permeable motor armature mounted for rotation adjacent the field poles and including a plurality of equidistantly spaced armature poles differeing in number from and not a multiple of the number of field poles and having a pole pitch different from that of the field poles, whereby the armature is rotated at a speed proportional to the speed of the moving part.

9. In an electric tachometer of the type having a receiving unit for indicating the speed of an internal combustion engine having a distributor including a base, a removable cap, a drive shaft, and a detachable rotor; the combination of a sending unit cylindrical body adapted to be secured upon the distributor base in place of the cap, means for securing the cap to the sending unit body, a rotatable operating member having means to form a detachable driving connection with the drive shaft of the distributor and means to form a detachable connection with the distributor rotor, a converting unit carried by the body connected with the operating member for electrically sensing movements of the member, and a plurality of conductors for connecting the converting unit with the receiving unit.

10. In an electric tachometer of the type having a receiving unit for indicating the speed of an internal combustion engine having a distributor including a base, a removable cap, a drive shaft, and a detachable rotor; the combination of a sending unit cylindrical body adapted to be secured upon the distributor base in place of the cap, means for securing the cap to the said body, a rotatable operating member having means to form a detachable driving connection with the drive shaft of the distributor and means to form a detachable connection with the distributor rotor, said rotatable member having a cylindrical electrical contact having a continuous surface and an interrupted surface, a plurality of switch elements contacting said operating member on said cylindrical electrical contact whereby said switch elements are electrically connected and disconnected in response to rotation of the said member, and a plurality of conductors for connecting said switch elements with the receiving unit.

11. A speed indicator for measuring the speed of a moving part, comprising a plurality of ring magnets each having a plurality of magnetic poles, a rotatably mounted nonmagnetic cup within which the ring magnets are positioned in spaced-apart coaxial array, means coupling the cup with the part for rotation, a conductive drag member rotatably mounted outside of and spaced from the cup, means biasing the drag member, and indicating means connected with the drag member.

12. A speed indicator for measuring the speed of a moving part, comprising a ring magnet having a plurality of magnetic poles, a compensating ring of a material having a relatively great negative temperature coefficient of permeability, a rotatably mounted nonmagnetic supporting cup within which the ring magnet and the compensating ring are positioned adjacent each other in coaxial array, means coupling the cup with the part for rotation, a conductive drag member rotatably mounted outside of and spaced from the cup, means biasing the drag member, and indicating means connected with the drag member.

13. A speed indicator for indicating the speed of a moving part, comprising a rotatably mounted ring magnet having a point of discontinuity and having a plurality of magnetic poles greater in number than two, one of said poles being situated at the point of discontinuity, means coupling the magnet with the part for rotation, a conductive drag member rotatably mounted adjacent the magnet, means biasing the drag member, and indicating means connected with the drag member.

14. A motor for use in an apparatus for remotely manifesting the motion of a rotary device, the apparatus including switching means driven by the device for sequentially energizing two electrical circuits, comprising the combination of four equidistantly spaced field poles including respective field coils and respective pole extensions on one side of each pole, the pole extensions being to the same side of each pole, means for electrically connecting opposite pairs of the coils together, means for connecting the pairs of coils to the circuits for sequential energization, and a magnetically permeable rotor mounted for rotation adjacent the field poles and having six equidistantly spaced rotor poles with a pole pitch different from that of the field poles.

15. In an apparatus for remotely manifesting the motion of a rotary device, the combination of switching means for operation by the device to energize two electrical circuits sequentially, four equidistantly spaced field poles including respective field coils and respective pole extensions on one and the same side of each pole, means for electrically connecting opposite pairs of the coils together and for connecting the pairs of coils to the circuits for sequential energization, and a magnetically permeable rotor mounted for rotation adjacent the field poles and having six equidistantly spaced rotor poles with a pole pitch different from that of the field poles.

PETER WARGO.

References Cited in the file of this patent

UNITED STATES PATENTS

| Number | Name | Date |
|---|---|---|
| 443,606 | Johnson | Dec. 30, 1890 |
| 995,731 | Stewart | June 20, 1911 |
| 1,057,682 | Stewart | Apr. 1, 1913 |
| 1,077,438 | Stewart | Nov. 4, 1913 |
| 1,171,021 | Canton | Feb. 8, 1916 |
| 1,309,390 | Young | July 8, 1919 |
| 1,371,096 | Howe et al. | Mar. 8, 1921 |
| 1,482,597 | Berge | Feb. 5, 1924 |
| 1,735,623 | Walker | Nov. 12, 1929 |
| 1,857,674 | Zubaty | May 10, 1932 |
| 1,933,086 | Battegay | Oct. 31, 1933 |
| 1,980,019 | Wallis | Nov. 6, 1934 |
| 1,988,568 | Randolph | Jan. 22, 1935 |
| 2,073,153 | Helgeby | Mar. 9, 1937 |
| 2,108,014 | Jones | Feb. 8, 1938 |
| 2,211,543 | Kollsman | Aug. 13, 1940 |
| 2,224,954 | Eisele | Dec. 17, 1940 |
| 2,232,789 | Kollsman | Feb. 25, 1941 |
| 2,249,029 | Mullerheim | July 15, 1941 |
| 2,263,264 | Duwe | Nov. 18, 1941 |
| 2,273,848 | Ely | Feb. 24, 1942 |
| 2,305,018 | MacGillivray | Dec. 15, 1942 |
| 2,400,668 | Tolnai | May 21, 1946 |
| 2,422,067 | Bechberger | June 10, 1947 |
| 2,449,078 | Lindenblad | Sept. 14, 1948 |
| 2,529,082 | Jaynes | Nov. 7, 1950 |